No. 801,060. PATENTED OCT. 3, 1905.
A. CASTELIN.
HARVESTER.
APPLICATION FILED JAN. 9, 1902.

Witnesses,

Inventor
André Castelin
By James L. Norris.
Atty.

No. 801,060. PATENTED OCT. 3, 1905.
A. CASTELIN.
HARVESTER.
APPLICATION FILED JAN. 9, 1902.

No. 801,060. PATENTED OCT. 3, 1905.
A. CASTELIN.
HARVESTER.
APPLICATION FILED JAN. 9, 1902.

Witnesses:
James L. Norris Jr.
C. W. Kesler.

Inventor
André Castelin
By James L. Norris.
Atty.

UNITED STATES PATENT OFFICE.

ANDRÉ CASTELIN, OF PARIS, FRANCE, ASSIGNOR TO THE SOCIÉTÉ ANONYME D'ETUDES ET D'EXPLOITATION DES BREVETS A. CASTELIN POUR MACHINES AGRICOLES AUTOMOBILES, OF PARIS, FRANCE.

HARVESTER.

No. 801,060.    Specification of Letters Patent.    Patented Oct. 3, 1905.

Application filed January 9, 1902. Serial No. 89,085.

*To all whom it may concern:*

Be it known that I, ANDRÉ CASTELIN, engineer, a citizen of the French Republic, residing at Paris, Department of Seine, France, (whose post-office address is 17 Rue St. Florentin, in said city,) have invented certain new and useful Improvements in Harvesters, of which the following is a specification.

This invention has for its object to provide an improved harvester and binder.

The invention aims to construct a harvester and binder which shall be comparatively simple in its construction, strong, durable, efficient in its use, and comparatively inexpensive to set up.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Fig. 10 is a detail view of the needle-driving mechanism, the needle being in its rearward position. Fig. 15 is a perspective view of the compressor and its general arrangement.

Figure 1:
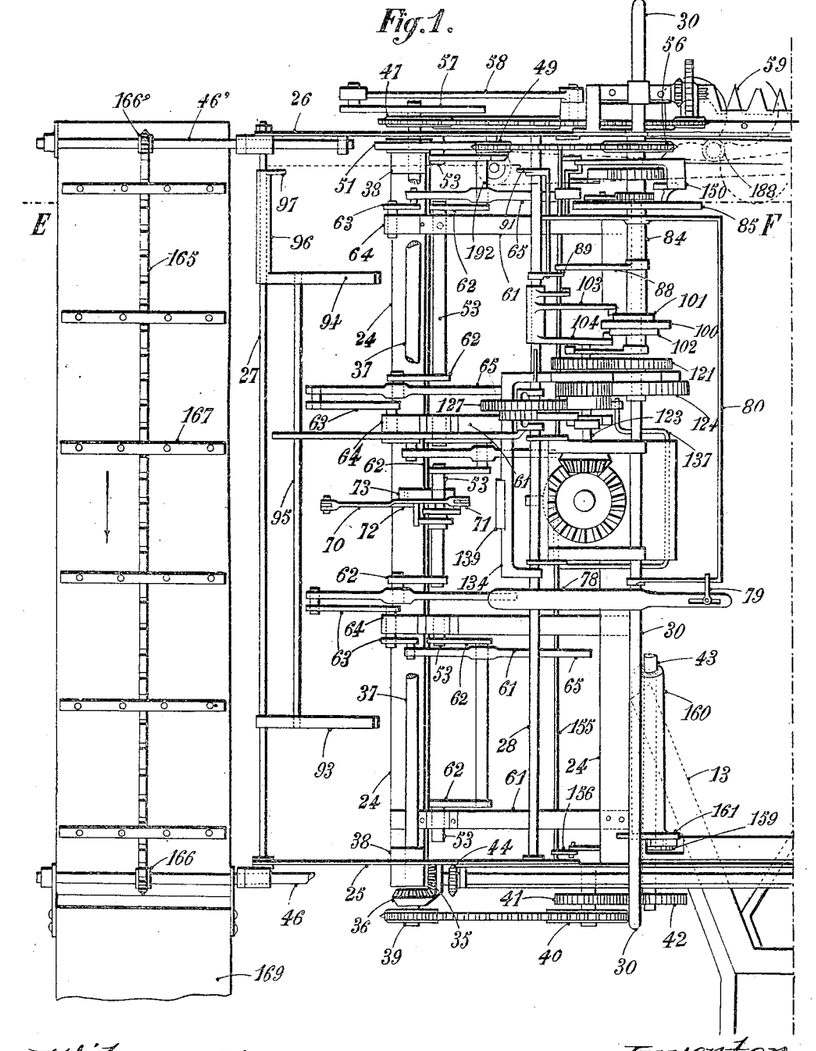
Figures 1 and $1^a$ when taken together illustrate an enlarged plan view of the harvester and binder.
Figure 1A:
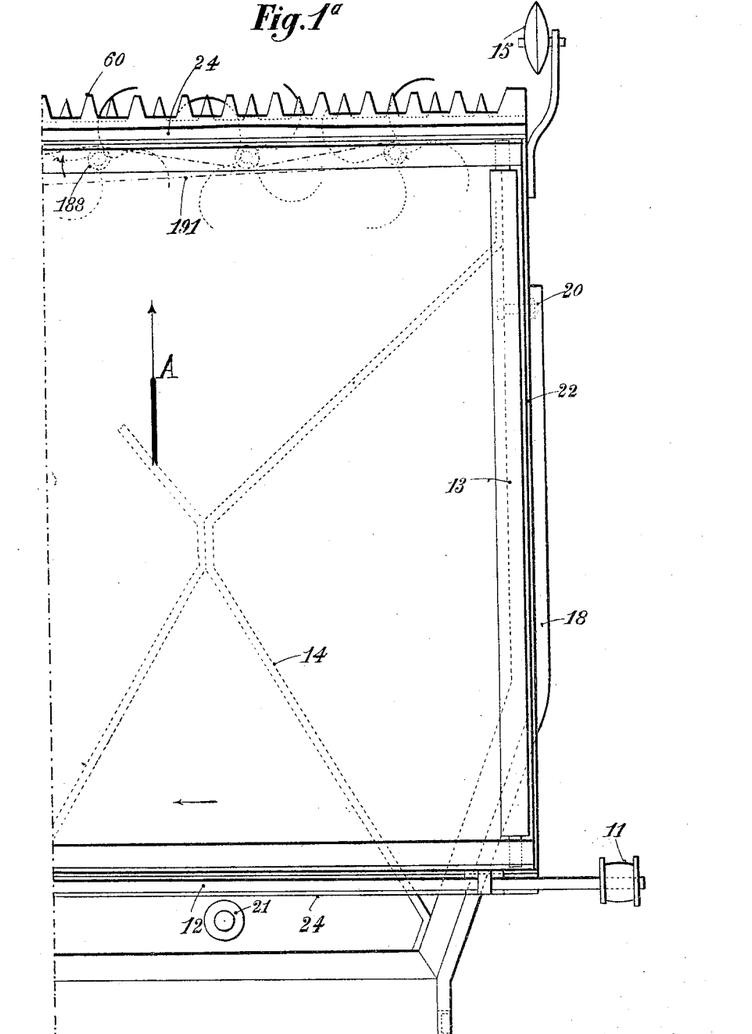
Figure 2:
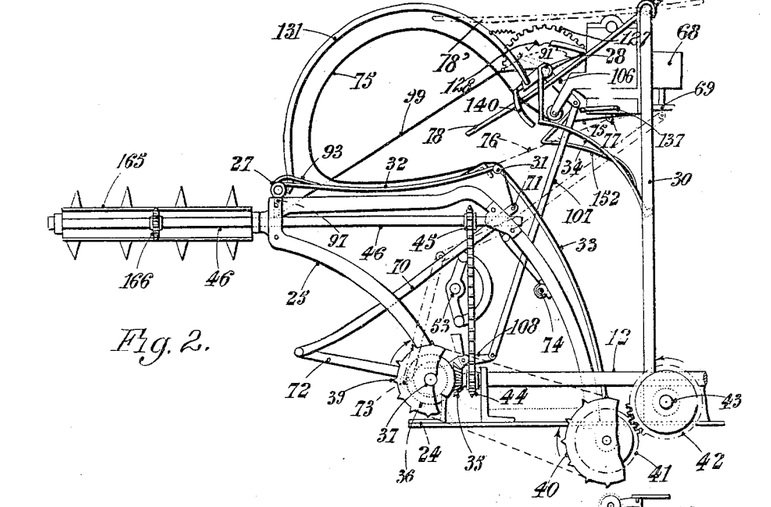
Fig. 2 is a side elevation of the binder mechanism at the rear of the machine—say on the side of the driving-shaft.
Figure 3:
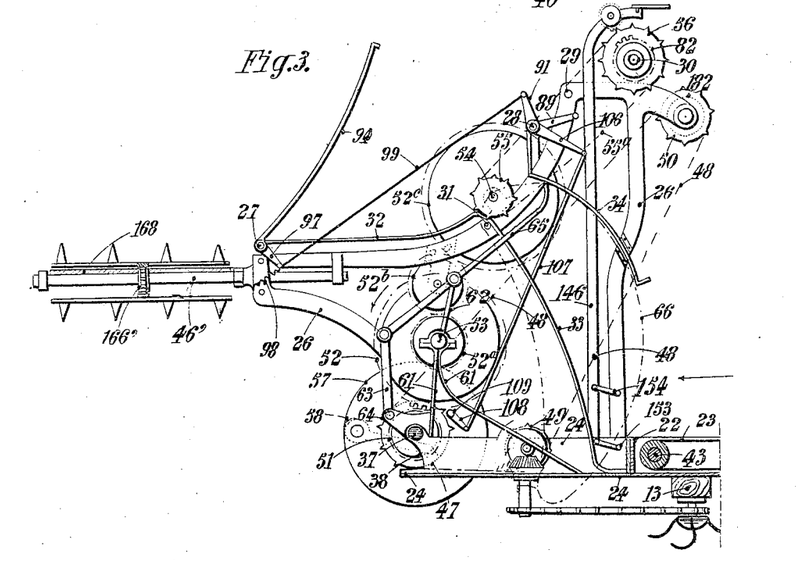
Fig. 3 is a side sectional elevation of the binder mechanism at the front of the machine through the line E F on Fig. 1.
Figure 4:
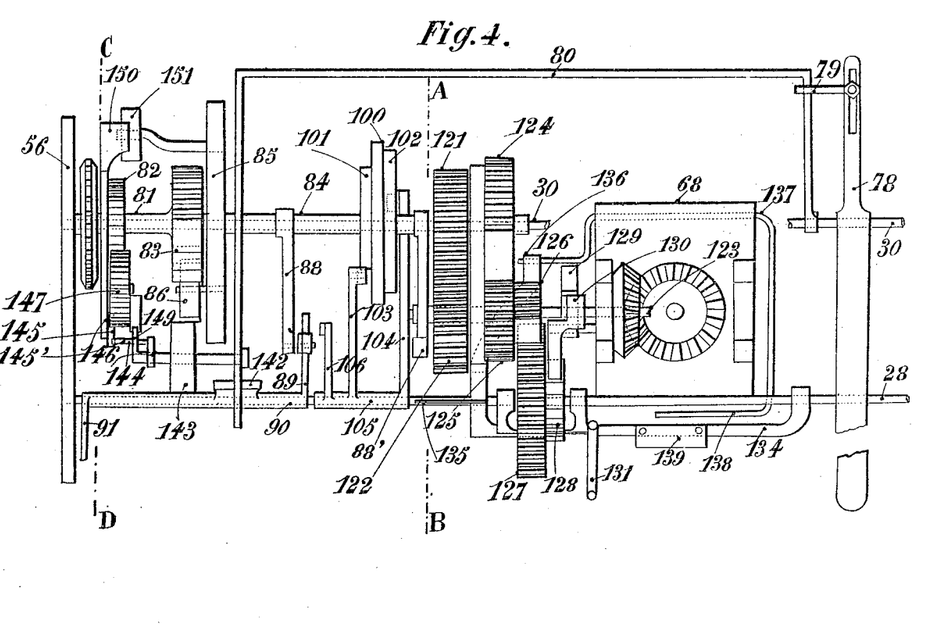
Fig. 4 is a plan view of the entire sheaf-forming mechanism. Fig. $4^a$ is a side elevation of the same.
Figure 4A:
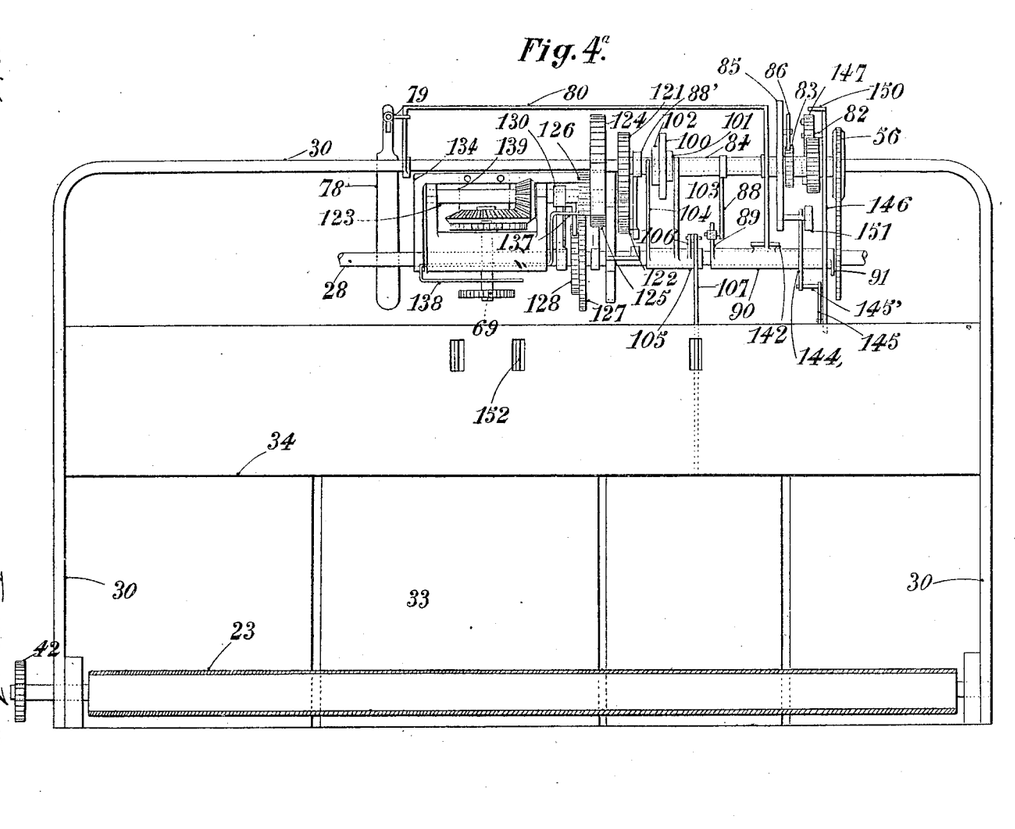

The general construction of the reaping-machine proper is shown in Figs. 1, $1^a$, 2, and 3, and comprises a frame 13, a metal tray or trough 22 resting thereon and carrying the apron or endless cloth 23, a frame of angle-iron 24 surrounding the tray, two upright brackets 25, Figs. 1 and 2, and 26, Figs. 1 and 3, fixed to the angle-iron frame, and cross-rods 27, 28, 29, 30, and 31, which support the brackets 25 26 and the working parts of the machine. Between the two said brackets and supported on cross-rods 27 and 31, Figs. 2 and 3, is the table 32, on which the crop rests when brought forward by the elevating-arms 65, Figs. 1 and 3. This table is formed of a metal plate suitably shaped and is extended downwardly, as shown at 33, and fixed to the angle-iron frame 24. Opposite to this extended portion 33 of the table 32 is a shaped or bent plate 34, supported on the transverse cross-rod 28, on the bracket 26, as shown in Figs. 2 and 4. Figs. 1 to 3 illustrate the general gear of the machine, in which 12 is the driving-shaft, operated by the pulley 11, which transmits motion, by means of the bevel-wheels 35 36, to the shaft 37, which will be termed the "main" driving-shaft of the mechanism. This shaft extends from end to end of the machine and rotates in suitable bearings 38, provided on the angle-iron frame 24. At the rear of the machine the shaft 37 carries at its end a chain-wheel 39, which transmits motion, through a chain and chain-wheel 40 and toothed wheels 41 and 42, to the shaft 43 of one of the rollers of the apron 23. The driving-shaft 12 carries a chain-wheel 44, gearing by a chain with a chain-wheel 45, keyed on a horizontal shaft 46, carried by the bracket 25, and constituting the driving-shaft of the sheaf-transporting mechanism hereinafter described.

At the front of the machine—say near the bracket 26—the shaft 37 is provided near its end with a chain-wheel 47, (see Fig. 3,) which transmits motion by a chain 48 to the two chain-wheels 49 and 50. A pinion 51, placed on the shaft 37, gears with a toothed wheel 52, keyed on a shaft 53. Motion is further transmitted from the said wheel 52 by means of gear-wheels $52^a$, $52^b$, and $52^c$ to a shaft 54, which carries a chain-wheel 55, communicating motion through a chain $55^a$ to a chain-wheel 56, arranged to rotate on the cross-piece 30. At the end of the shaft 37 a crank-disk 57 is keyed so as to rotate therewith, and said disk 57 is connected with the movable blade 59 of the cutter through the medium of a rod 58, which will impart a reciprocating movement to said blade 59 when said disk 57 is operated through the medium of the shaft 37. From this description it will be seen that when the driving-shaft 12 is rotated the cutter 59 is caused to operate and the endless apron 23 to move in the direction of the arrow, so as to bring the grain to the foot of the channel formed by the space comprised between the two metal plates 33 and 34 aforesaid. The grain, arriving by the channel formed between the iron sheets 33 and 34, is carried by the elevating-arms 65 to the table 32, where it accumulates to form a sheaf.

68, Fig. 2, denotes a knotter of the kind described in United States of America patent granted to me, dated September 2, 1902, No. 708,316.

Figure 9:
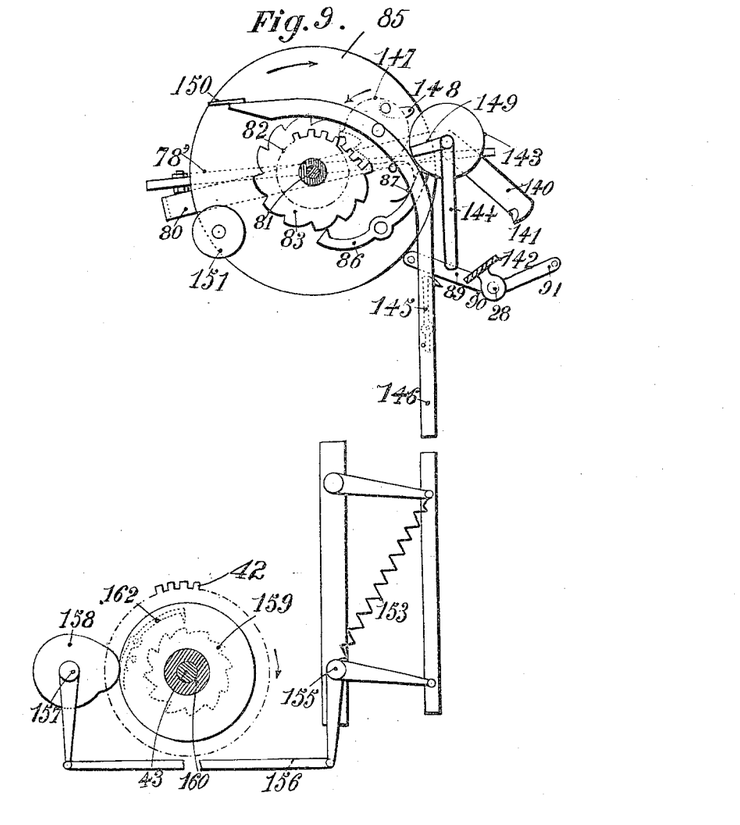
Fig. 9 is a similar view to Fig. 8, but shows the said mechanism in its disengaged position. Fig. $9^a$ is a rear view of parts of preceding mechanism.
Figures 9A, 10:
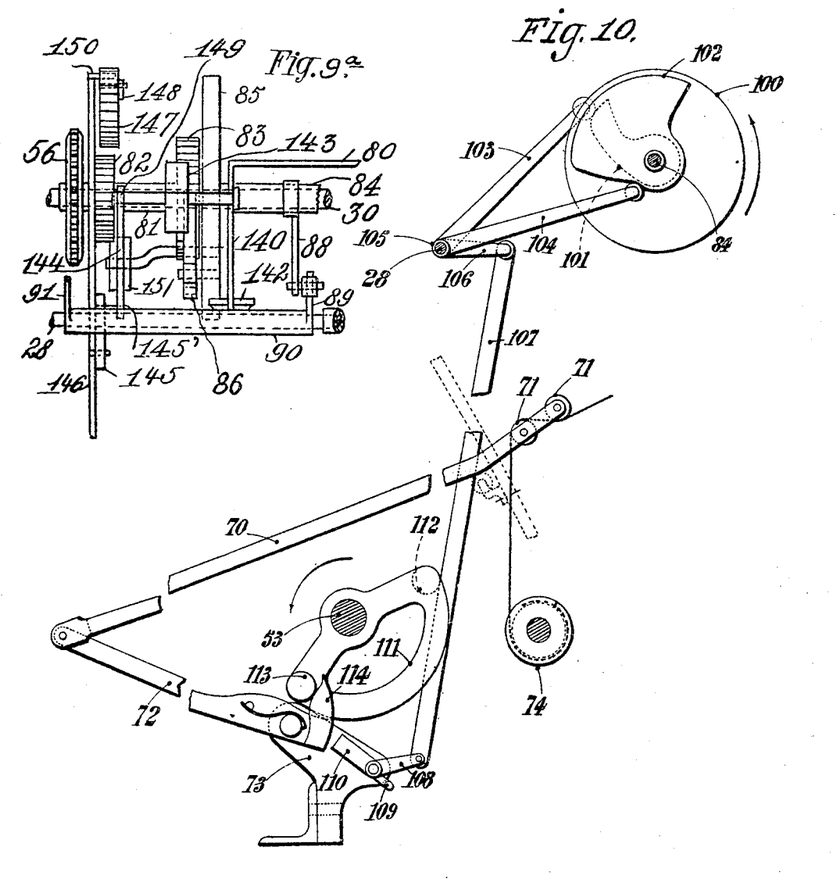

70 is a needle having a fork at one end, between the arms of which are two small rollers 71, Figs. 2 and 10, over which passes the binding material or cord for surrounding the sheaf. The other end of the needle is jointed to a rod 72, pivoted in a support 73. The needle receives a forward and return motion at given intervals of time, as hereinafter described with reference to Figs. 10 to 12.

Referring to Fig. 2, if the binding medium tightly held at 69 and capable of unwinding from a bobbin 74, for example, be stretched between the points 69 and 71 across the passage of the grain the said binding material will be engaged by the ascending sheaf and will conform to the curve 75, surrounding the sheaf in process of formation. If now the needle be shot forward so that its end 71 approaches the point 69, the cord will assume the form of the curve 75 76. The fingers of the binder will then make the knot, the binding medium or cord be cut, and the sheaf properly tied up.

As the grain accumulates on the table 32 it comes in contact with a trip-arm 78. This is formed, as shown in detail in Figs. 4 and 7, of a metal blade or plate oscillating on the cross-piece 30 and provided with a tappet 79, the position of which on the blade can be adjusted as desired. This trip-arm can thus be elevated during the formation of the sheaf, and when the same has reached the desired thickness it occupies the position 78'. (Shown in dotted lines in Fig. 2.) In this position the tappet 79 strikes against a frame 80, Figs. 1, 4, 8, 9, and $9^a$, which is thus caused to rock on its bearings, thereby causing the release of the mechanism which effects the compression of the sheaf, the binding and knotting, and the removing of the sheaf from the machine. The chain-wheel 56, Fig. 4, receives a continuous rotary movement and is mounted on a sleeve 81, turning on the cross-rod 30 and formed in one with a wheel 82 and a ratchet 83.

Adjacent to the sleeve 81, Figs. 4, $4^a$, and $9^a$, is a sleeve 84 of greater length than the aforesaid sleeve 81 and is provided at one of its ends with a disk 85, to which is secured a pawl 86, engaging with the teeth of a ratchet-wheel 83, the pawl 86 being under the action of a spring 87. The sleeve 84 is also provided with a crank 88, having a friction-roller working against an arm 89, forming part of a sleeve 90, which terminates in a second arm 91. This sleeve 90, which can be moved along the cross-rod 28, serves conjointly with the aforesaid crank 88 for working the ejector. The latter (shown in Figs. 1, 2, and 3) consists of two flat metal arms 93 and 94 oscillating on the cross-rod 27 and having the same curve as the table 32, on which they normally rest. The two arms are connected together by a rod 95. The arm 94 forms part of a sleeve 96, which carries a lever 97 and is movable on the cross-rod 27. A spring 98 tends to keep the ejector on the table 32, and a connection 99 joins the ends of the rods 97 and 91, Figs. 2, 4, and $9^a$. It is easily understood that when the crank 88 acts on the arm 89 the ejector 93 94 rises by oscillating on the transverse rod 27 and that in this manner it withdraws the sheaf from the table 32.

Figures 11, 12:
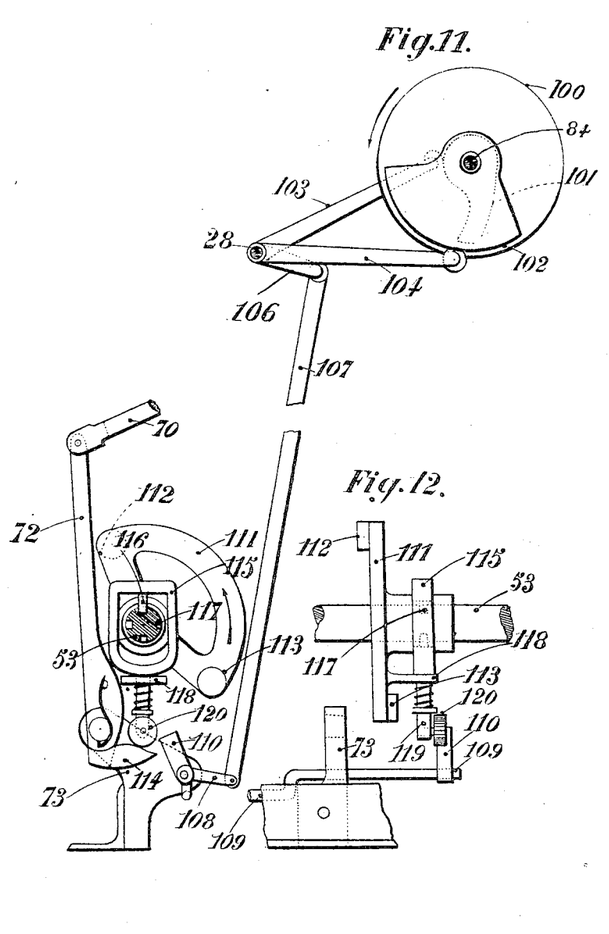
Fig. 11 shows the same mechanism, but with the needle in its forward position.
Fig. 12 is a side view of the arrangement for locking the needle-operating cam. Figs. $12^a$, $12^b$, and $12^c$ show several details of the preceding arrangement.
Figures 12A, 12B:
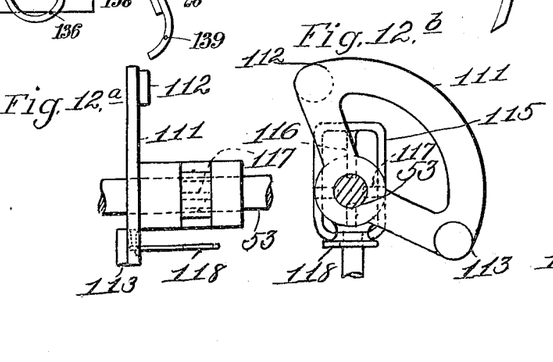
Figure 12C:
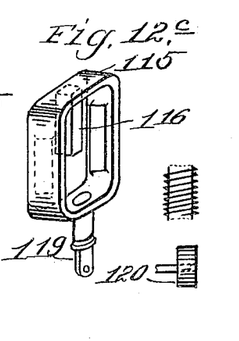

A disk 100, keyed on the sleeve 84, Figs. 4 and $4^a$, is provided on each of its faces with a cam 101 102 engaging with the arms 103 104, respectively, the said arms 103 104 projecting from a sleeve 105, rotating on the cross-rod 28 and carrying a crank 106. The latter is connected by a rod 107 and a crank 108 to a crank-shaft 109, carried by the support 73, Figs. 10 to 12, and on the said shaft 109 is mounted a tappet 110 for causing the release of the mechanism for operating the needle. This mechanism is illustrated on a larger scale in Figs. 10, 11, 12, and $12^a$. The device for causing the advance and return of the needle consists of a sector 111 or the like mounted at or about the central part of the shaft 53 and provided on each of its faces with friction-rollers 112 113. The position of the sector 111 on the shaft 53 is such that the roller 112 is moved in the plane of the rod 72, to the end of which the needle is attached, and the roller 113 is opposite a tappet 114, fixed to the lower end and on one side of the rod 72. If the sector 111 is rotated by the shaft 53 in the direction of the arrow, Figs. 10 and 11, the roller 112 will cause the rod 72 to draw back the needle, while the roller 113 will cause the tappet 114 to throw it forward; but as the shaft 53 rotates continuously and the throw of the needle must be intermittent an arrangement for locking and unlocking the sector is required. This is illustrated in Figs. 11, 12, 12$^a$, 12$^b$, and 12$^c$ of the accompanying drawings. The nave of the sector is provided with a groove, in which fits a frame 115, vertically adjustable and provided with a pin or projection 116, engaging in one of four notches 117 formed in the shaft 53, Figs. 12$^a$ and 12$^b$. The frame 115 is connected to the sector 111 by a support 118 and is provided at its lower side with a rod 119, having a spring, Fig. 12$^c$, having one end bearing on a projection on the rod 119 and the other on the support 118, Fig. 12, and tending to draw the said frame downwardly, so as to keep the pin or projection 116 in engagement with one of the notches 117, which comes in front of it. The said rod 119 of the frame 115 has a friction-roller 120, which, when it rotates with the shaft 53, will come into contact with the tappet 110, already referred to. If the tappet 110 is in the position shown in Fig. 11 and if the sector 111 that carries the frame 115 is moved in the direction indicated by the arrow, the roller 120 will be raised by the tappet 110, thus raising the frame 115, releasing the pin or projection 116 from the notch 117 and so setting the sector 111 free from the shaft 53, the nave of the said sector fitting with frictional contact on the said shaft. The sector being thus released from rotating with the shaft will no longer actuate the needle; but when the tappet 110 is in the position indicated by Fig. 10, as the roller 120 will meet no obstacle in its course, the sector 111 will participate in the rotary movement of the shaft 53. The oscillations of the tappet 110 are regulated, as shown in Figs. 10 and 11, by the cams 101 102. When the plate 100 rotates in the direction of the arrow, the cam 102 will first cause the jointed parts 104 to 109 to be lowered so as to raise the tappet 110. The cam 101 then operates the parts 103 to 109 so as to raise them and lower the tappet 110.

Referring now to Figs. 4 and 4$^a$, the sleeve 84 is provided with a toothed wheel 121, gearing with a wheel 122, keyed on the shaft 123, which is the driving-shaft of the binder 68. Adjacent to the toothed wheel 121 is keyed a wheel 124, which is provided with teeth through only a portion of its circumference. The said wheel 124 is termed a "mutilated" gear and gears with a toothed wheel 125, loose on the shaft 123. The toothed wheel 125 carries a toothed sector 126, which is adapted to gear with a toothed sector 127, moving on the cross-rod 28. The mutilated gear 124, toothed wheel 125, and sectors 126 and 127 constitute the mechanism operating the compressor. The sector 127 is rigid with a ratchet 128, gearing with a pawl 129, Fig. 5, the movements of which are controlled by a cam 130, keyed on the shaft 123. The compressor, which is connected to the toothed sector 127, is shown separately in perspective in Fig. 15. It consists, essentially, of a semicircular gage or former 131, connected to or carried by a yoke 132, oscillating on the cross-rod 28, the yoke 132 carrying a tappet 133 bent to an angle. The sector 127 and yoke 132 are loosely mounted on the shaft 28. As shown in Fig. 2, the compressor extends above the table 32, and its depression effects the compression of the sheaf. On the cross-rod 28 a frame 134 is loosely mounted and which is shown in perspective in Fig. 15. The said frame is provided with an arm 135, against which the tappet 133 of the compressor can strike. A bent blade 136, Figs. 5 and 15, which forms an extension of the frame 134, is arranged so that when the frame 134 rises it comes in contact with a cranked rod 137, jointed to the binder 68, having for its object to effect, by the depression of its part 138, the liberation of the knot of the latter, if not completely freed from the binder.

Figure 5:
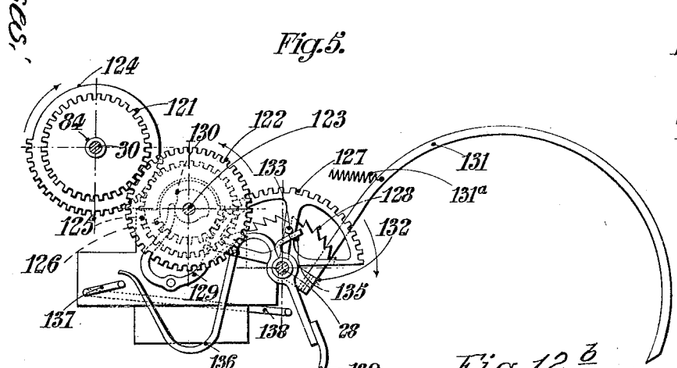
Fig. 5 is a cross-section on the line A B of Fig. 4, seen from left-hand side. Fig. $5^a$ is a detail.
Figures 5A, 14A, 14B, 15:
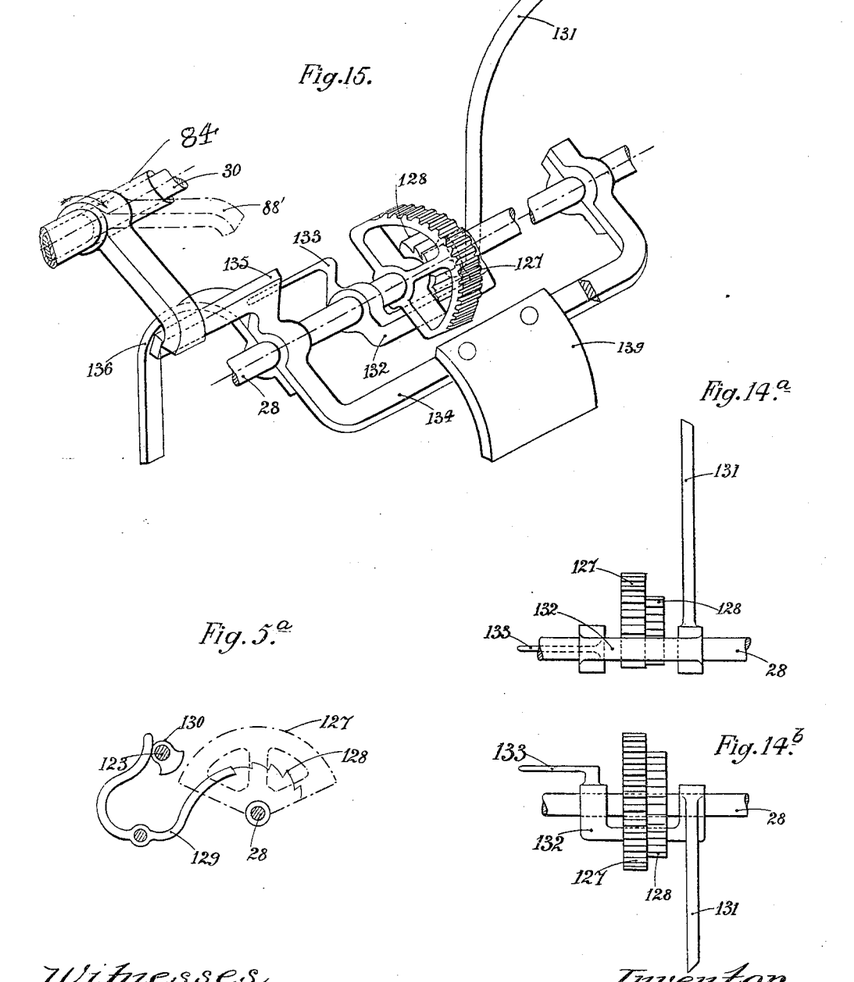

Referring to Figs. 2 and 5, it may be seen that when the said part 138 is depressed it meets the binding medium 75 76, which is stretched between the sheaf and the point 77 of the knotter, where the knot has been made, and in this manner it depresses the binding medium, the end of which remains clamped between the fingers of the knotter. The frame 134 also carries a plate or front piece 139, which moves forward when the said frame is raised, so as to push forward the sheaf placed on the table 32. As shown on Figs. 5 and 4, the plate 136 coming into contact with the cranked rod 137 depresses the plate 138, which bears on the binding medium which has been knotted by the knotter 68 and is stretched between the bound sheaf and the knotter. The pressure of the part 138 liberates the knot from the fingers 77 of the knotter 68. The frame 80 oscillates on the cross-piece 30 and is controlled, as already described, by the action of the trip-arm 78. On the end of this frame is an arm 140, Figs. 8, 9, and 9$^a$, provided with a notch 141, which normally engages with a projection 142 on the sleeve 90 to render stationary the mechanism for operating the ejector. To the frame 80 is also fixed a friction-roller 143, whose distance from the axis of the cross-piece 30 is such that it bears on the pawl 86 to keep it free of the teeth of the ratchet-wheel 83. The axis of the friction-roller 143 carries a lever 144, the end of which is engaged by a pawl 145, mounted on a vertical rod 146. This rod 146 is bent at its upper part and carries a toothed wheel 147, on which is secured a claw 148 of such a length that when the roller 143 begins to rotate the said claw can strike a small arm 149 on the end of the axle of the said roller 143. The toothed wheel 147 comes into gear with the toothed wheel 82 when the rod 146 descends, as hereinfter described. The rod 146 has a plate 150 at its upper end, against which a roller 151 on the plate 85 strikes to raise the aforesaid rod 146. When the rod 146 is in its lower position, the wheel 147 gears with the wheel 82 and is set in rotation. When the claw 148 of the wheel 147 comes into contact with the arm 149, it causes this arm and the roller 143 to be raised, as shown in Fig. 9, sufficient to allow the roller to leave the pawl 86. Thus the pawl is thrown into gear with the ratchet-wheel 83, and the disk 85, carrying the pawl, is set into rotation in the direction of the arrow. The roller 151 during the rotation of the disk 85 comes into contact with the plate 150 and raises the rod 146.

Figure 6:
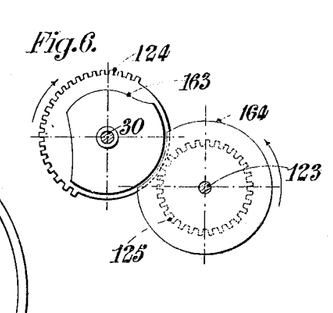
Fig. 6 is a separate view of parts of Fig. 5.
Figures 7, 8:
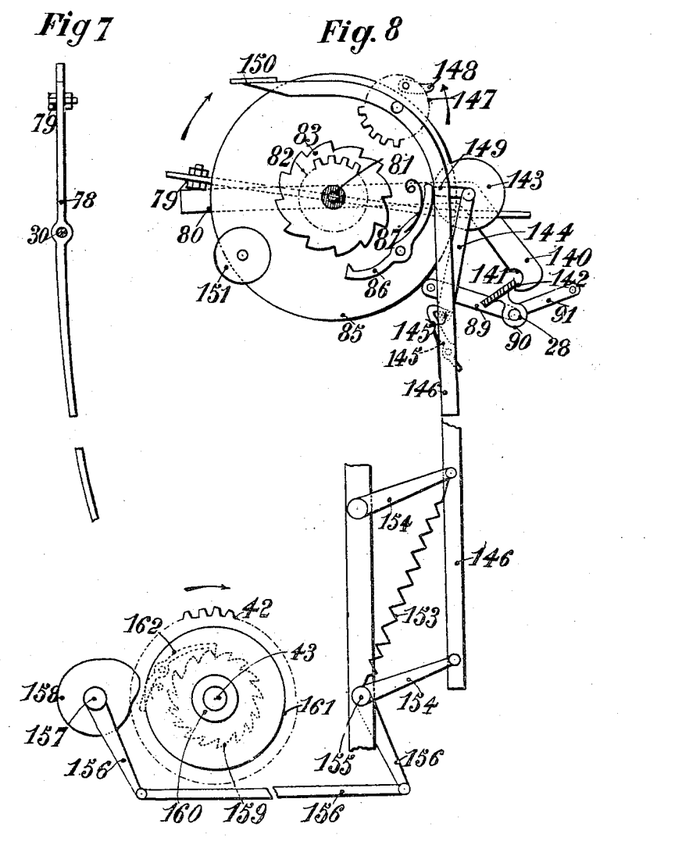
Fig. 7 is a detail view of the trip-arm seen on Fig. 4.
Fig. 8 is a vertical section on line C D, Fig. 4, showing the mechanism in its engaged position.
Figures 13, 14:
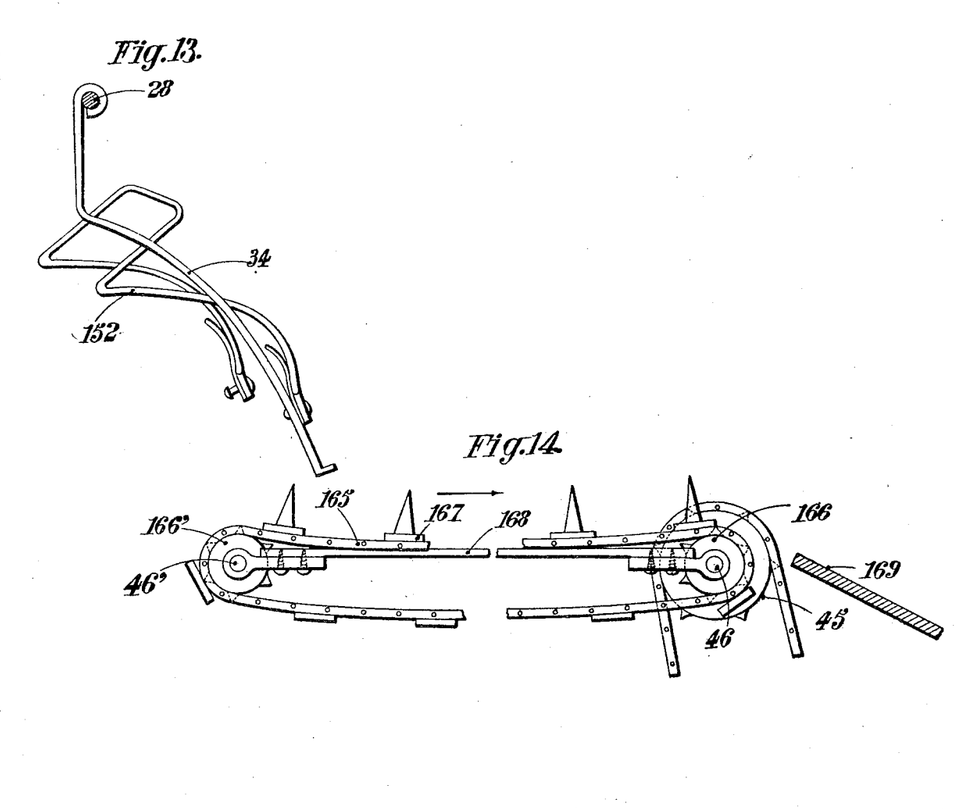
Fig. 13 is a perspective view of one of the auxiliary compressors.
Fig. 14 is a side elevation of a sheaf-carrier. Figs. $14^a$ and $14^b$ are details.

The aforesaid mechanism operates as follows: While the grain is being raised by the elevators, the needle occupies the rearward position shown in Figs. 2 and 10. The grain which engages the cord stretched between the points 71 and 69 accumulates between the table 32 and the gage or compressor, which has been lowered by the toothed sector 127, the raising of which is prevented by the pawl 129 engaging in the teeth of the ratchet-wheel 128. To assist in the compression of the sheaf, two small auxiliary compressors 152 are employed, formed of metal rods bent as shown in Fig. 13. The compressors, which are flexible, are fixed to the plate 34, Fig. 2, and project inwardly across the upward course taken by the material being compressed. As the sheaf is formed the grain raises the trip-arm 78, causing it to turn on the cross-rod 30, its tappet 79 meeting the oscillating frame 80 at a certain period in the movement engages the same. When the sheaf is of sufficient size, the regulator, which now occupies the position 78', has sufficiently raised the frame 80 so as to effect the release of the rod 146 and the engagement of the mechanism. The effect produced is as follows, Fig. 9: First. When the rear of the frame 80 is depressed, the notch 141 of its extension 140 is released from the projection 142—that is, it liberates the mechanism operating the ejector. Second. The rising of the lever 144 causes a pin or projection 145', Figs. 4, 4ª, 8, and 9ª, to describe the arc of a circle, thus releasing the dog 145. Then the parallelogram formed by the rod 146 and the two cranks 154 is depressed both by the action of its own weight and by that of the spring 153, bringing the toothed wheels 82 and 147 into engagement with each other. As the wheel 147 rotates the claw 148 comes into contact with the arm 149 and causes said arm 149 and the roller 143 to be raised sufficient to move the roller 143 out of the path of the pawl 86. Thus the pawl 86 is thrown into gear with the ratchet-wheel 83, and the disk 85, carrying the pawl 86, then rotates in the direction of the arrow. The roller 151 during the rotation of the disk 85 comes into contact with the plate 150 and raises the rod 146. Third. The roller 143 on being raised escapes from the pawl 86, so that this latter, operated by the spring 87, engages with the teeth of the ratchet-wheel 83, and since thus latter continuously rotates in the direction of the arrow the disk 85 becomes engaged as it rotates, as well as all the parts dependent on the sleeve 84. The depression of the rod 146 is also utilized for producing the immediate arrest of the apron or endless cloth 23, which should remain motionless during the binding and the ejection of the sheaf. This arresting of the apron, which is one of the essential features of my present invention, produces interruptions in the feed of the grain, facilitating the formation of the knot, since the binding material is entirely freed from the grain from below during its formation. This arrangement further is necessary for the purpose of allowing the needle to be shot across the path of the grain, that would be very difficult or even impossible if the channel formed by the extended portion of the table 33 and the plate 34 be full of grain during this period. To obtain this result, the rod 146, Figs. 8 and 9, is connected by two levers 154, forming a parallelogram with an upright forming part of the frame of the machine. The lower lever 154 is keyed on a horizontal shaft 155, extending from one end to the other of the machine—say toward the driving mechanism of the shaft 43 of the endless band or apron 23— and is connected by a series of jointed levers 156 with a shaft 157, on which a cam 158 is keyed. The shaft 43 is termed the "drive-shaft" for the endless cloth or cut-grain-conveyer apron and is operated by the gear-wheel 42, carrying a ratchet 159. The roller 160 turns freely on the shaft 43 and ends in a plate 161, on which a pawl 162 is mounted, which a spring keeps continually in contact with the teeth of the ratchet-wheel 159. The movement of rotation is indicated by the arrow. When the cam 158 is in the position indicated in Fig. 8, the pawl 162, through the ratchet 159, engages the roller 160. When the cam 158 is in the position indicated by Fig. 9, the pawl 162 is raised when passing before the cam and released from the teeth of the ratchet-wheel 159, and the roller carrying the endless cloth is no longer engaged. When the rod 146 is raised, the cam 158 returns to its original position and the apron is set in motion. Thus on the release of the frame 80 the apron is stopped and the sleeve 84 commences to rotate with all the parts which it carries. At this moment the following operations take place: The gear-wheels 121 122 are caused to rotate the shaft 123 of the knotting device. At this time the toothed wheels 124 125 are in such a position to each other that the last tooth of the partially-toothed wheel or sector 124 is in gear with the teeth of the wheel 125. Likewise the partially-toothed wheel or sector 126 is so placed with regard to the sector 127 that its last tooth will be in engagement with the said sector 127. At the beginning of the movement the compressor 131 is lowered and completes the compression of the sheaf and is maintained in this position by the pawl 129, which engages with the teeth of the ratchet-wheel 128 in one piece with the sector 127. The finger 133 of the compressor is then out of contact with the arm 135 of the frame 134, which at this moment is lowered. To prevent the compressor being raised during the binding operation and in order that all the strain does not bear on the pawl 129, I have devised a locking arrangement for the toothed wheels 124 125, which is shown in Fig. 6. This arrangement consists of two cams 163 164, secured to the toothed wheels 124 125. These cams engage one with the other, and their form, as seen in Fig. 6, is such that any movement of the wheel 125 is rendered impossible so long as the cam 163 retains the cam 164. The liberation takes place just as the teeth of the wheel 124 engage with those of the wheel 125. At the moment the compressor is lowered, as aforesaid, the cams 101 102 act on the lever arrangement which controls the tappet 110, Fig. 11, and bring this latter in the position of Fig. 10. The sector 111 is then allowed to rotate with the shaft 53, and its roller 113 acts on the tappet 114 of the vibrating arm 72, the effect of which is to move the needle forward and cause the binding medium to engage with the holding or gripping mechanism 69 of the knotter. When the cams 101 and 102 continue to rotate, they draw back the aforesaid lever mechanism which controls the tappet 110 in the position of Fig. 11, the sector 111 (shown in detail in Fig. $12^a$) becomes loose on the shaft 53, and the needle keeps its forward position during the remaining part of the rotation of the plate 100. At this time the knot is formed and the binding medium is cut in the manner described in Letters Patent 708,316, dated September 2, 1902. After the binding medium has been cut the cam 130 acts on the pawl 129, which is disengaged from the teeth of the ratch 128, so that the compressor becomes free and immediately raises under the combined action of the pressure of the sheaf and the tension of a spring $131^a$, secured to the frame of the machine. An arm 88', Fig. 4, fast on the sleeve 84, is caused to come into contact with the surface 135, as shown in dotted lines in Fig. 15, which bears on the lever 133. In the same time the lever 88 has met the shortest arm of the double-armed lever 89 91, the arm 91 of which describe an arc of a circle and causes the ejector to kick up by aid of the connecting-rod 99, Fig. 3. The plate 139, forming a part of the frame 134, is raised and pushes forward the sheaf which is freed. The end of the blade 136 acts in the same time on the bent rod or lever 137, the outer end of which disengages completely the knot from the knotter if this operation has not been effected automatically by the binding medium stretched round the sheaf. At this moment the ejection of the sheaf is completed—that is to say, that the arm or crank 88 acts on the arm 89, which controls the oscillating system 91 99 97, causing thus the ejector 94 to rise and withdrawing the completed sheaf from the table, as aforesaid. As soon as the arm 88 has released the arm 89 the whole lever arrangement becomes free and the ejector falls back on the table under the combined action of its proper weight and that of the spring 98. While the wheel-gearing shown in Figs. 4, $4^a$, and 5 continues to rotate, the wheels 124 125 126 act on the sector 127 in order to lower the compressor. At the same time the cam 130 frees the pawl 129, which engages again with the teeth of the ratchet-wheel 128. During this time the cams 101 and 102, Fig. 11, have completed one revolution and have again operated the tappet 110, which releases the sector 111, the roller 112 of which acts on the vibrating arm 72 for the purpose of drawing the needle into its backward position, and as the oscillating system 103–110 is immediately returned into the position of Fig. 11 the needle remains in its backward position. At this moment the binding medium is stretched between the points 69 and 71—say across the path of the ascending grain—the compressor is lowered, and the mechanism is ready for receiving the material to be formed into a sheaf. According to this invention the machine is arranged so that all the above-described operations will be effected for one revolution of the sleeve 84 or the plate 85. When the plate 85 turns, the roller 151 strikes a surface 150, which is fitted on the upper end of the rod 146, and therefore raises this rod to a position above that shown in Fig. 8. By this ascending movement the pawl 145 passes before the arm 144 and engages therewith by means of the pin 145'. When the roller 151 releases the surface or plate 150, the rod 146 falls down into the position of Fig. 8 and withdraws the frame, so that the notch 141 will receive the projection 142 and will prevent the operation of the ejector-operating mechanism. The frame 80 being in this position, the roller 143 is again placed in the path of the pawl 86, so that the latter is raised or turned when it passes before the roller 143, the resulting effect being to disengage the ratched wheel 83, and therefore to stop the movement of the plate 85. From the lower part of Figs. 8 and 9 it is seen that when the rod 146 is raised the endless band or apron 23 will then be caused to operate in a manner as hereinbefore set forth. The ejector instead of delivering the sheaves onto the ground, as is the case with machines of this kind, deposits them on a traveling belt placed at the side of the table, as shown in detail in Fig. 14 and also seen in Figs. 1, 2, and 3. This belt consists of an endless chain 165, passing over two chain-wheels 166 166', keyed on the shafts 46 and 46' and on which rakes 167 are arranged at certain distances apart. The shaft 46 is driven by the chain-wheels 45, Fig. 2, and 44, so that the chain 166 has a continuous movement. The upper side of this conveyer rests on a bearing-plate 168, situated between the shafts 46 and 46', serving to prevent the sagging of the belt carrying the rakes. The sheaves are thus transported horizontally by the conveyer in the direction of the arrow, from which is an inclined plane 169, down which they slide, to be forthwith deposited on the ground.

The operation of the machine is as follows: The machine is propelled forward in the direction of the arrow A by a motor-carriage fixed at the rear of the machine. The driving-shaft 12 of the machine is operated by a motor on the carriage by means of a suitable gearing—for instance, by a belt mounted on the pulley 11. The shaft 12 transmits motion by means of the bevel-wheels 35 36 to the main shaft 37. At the fore end of this shaft a crank-disk is keyed which is connected by a rod 58 to the moving blade 59 of the cutter, to which it imparts a reciprocating motion. The grain is cut between the moving blade 59 and the fixed portion 60 and falls down upon the endless apron 23. This endless apron is moved by the shaft 37 by means of an endless chain. The grain is brought by the endless apron 23 to the foot of the channel 33 34, where it is taken by the elevating-arms 65, set in motion by the rotation of the shaft 53 in gear with the shaft 37 by toothed wheels 51 and 52, the arms being connected to this shaft by a link 62 and to the frame of the machine by a link 63. The grain is brought by the said elevating-arms 65 on the table 32, where it accumulates to form a sheaf. The binding medium, stretched between the points 69 and 71, as hereinbefore described, is engaged by the ascending sheaf and conforms to the curve 75, surrounding the sheaf in process of formation. As the grain accumulates on the table 32 it comes in contact with a trip-arm 78, Figs. 4 and 7. This trip-arm is elevated during the formation of the sheaf, and when the same has reached the desired thickness it occupies the position shown in dotted lines in Fig. 2. In this position it strikes against the frame 80, which is thus caused to rock on its bearings. The rear of the frame 80 is depressed, Fig. 9. The lever 144 on the shaft of the roller 143, carried by the frame 80, is raised, causing the pin or projection 145' to describe the arc of a circle, and thus to release the dog 145, hinged to the rod 146. The parallelogram formed by the rod 146 and the two cranks 154 is depressed both by the action of its own weight and by that of the spring 153. The cam 158 is thus turned by means of the cranks 155, the rod 156, and the crank 157 and is caused to bear on the tail part of the pawl 162, carried by a plate 161, ending the roller 160, carrying the endless apron 23 and mounted loosely on the shaft 43. The pawl 162 is thus thrown out of gear from the ratchet-wheel 159, fixed on the shaft 43, and the apron is stopped. The roller 143 on being raised by the rocking of the frame 80 escapes from the pawl 86, so that this latter, operated by the spring 87, engages with the teeth of the ratchet-wheel 83, and since this latter is rotated by the shaft 37 by means of the chain-wheel 56 on the sleeve 81, carrying the ratchet-wheel 83 of an endless chain of the chain-wheel 55 on the shaft 54, and of toothed wheels, the disk is set in rotation as well as all the parts dependent on the sleeve 84. The gear-wheels 121 122 are caused to rotate the shaft 123 of the knotting device. At this time the toothed wheels 124 125 are in such a position to each other that the last tooth of the partially-toothed wheel or sector 124 is in gear with the teeth of the wheel 125. Likewise the partially-toothed wheel or sector 126 is so placed with regard to the sector 127 that its last tooth will be in engagement with those of the said sector 127. At the beginning of the movement the compressor 131 is lowered and completes the compression of the sheaf and is maintained in this position by the pawl 129, which engages with the teeth of the ratchet-wheel 128 in one piece with the sector 127. The finger 133 of the compressor is then out of contact with the arm 135 of the frame 134, which at this moment is lowered. When the teeth of the wheel 124 engage with those of the wheel 125, the locking mechanism which prevents the compressor from being raised during the binding operation is released. This mechanism, as aforesaid, consists of two cams 163 164, secured to the wheels 124 125, and the cam 163 is adapted to engage the cam 164, so as to prevent any movement of the wheel 125 until the cams 164 165 are released. At the moment the compressor is lowered, as aforesaid, the cams 101 102 act on the lever arrangement, which controls the tappet 110, Fig. 11, and bring this latter in the position of Fig. 10. The sector 111 is then allowed to rotate with the shaft 53, and its roller 113 acts on the tappet 114 of the vibrating arm 72, the effect of which is to move the needle forward and cause the binding medium to engage with the holding or gripping mechanism 69 of the knotter. When the cams 101 and 102 continue to rotate, they draw back the aforesaid lever mechanism which controls the tappet 110 in the position of Fig. 11. The sector 111 (shown in detail in Fig. 12ᵃ) becomes loose on the shaft 53, and the needle keeps its forward position during the remaining part of the rotation of the plate 100. At this time the knot is formed and the binding medium is cut in the manner described in my previous patent, No. 708,316, dated September 2, 1902. After the binding medium has been cut the cam 130 acts on the pawl 129, which is disengaged from the teeth of the ratchet 128, so that the compressor becomes free and immediately rises under the combined action of the pressure of the sheaf and the tension of a spring 131ª, secured to the frame of the machine. An arm 88', Figs. 4 and 5, fast on the sleeve 84, is caused to come into contact with the surface 135, Fig. 15, which applies on the lever 133. In the same time the lever 88 has met the shortest arm of the double-armed lever 89 91, the arm 91 of which describes an arc of a circle and causes the ejector to kick up by aid of the connecting-rod 99, Fig. 3. The plate 139, forming a part of the frame 134, is raised and pushes forward the sheaf, which is freed. The end of the blade 136 acts at the same time on the bent rod or lever 137, the outer end of which disengages completely the knot from the knotter if this operation has not been effected automatically by the binding medium stretched round the sheaf. At this moment the ejection of the sheaf is completed—that is to say, the arm or crank 88 acts on the arm 89, which controls the oscillating system 91 99 97, causing thus the ejector 94 to raise and withdraw the completed sheaf from the table, as aforesaid. As soon as the arm 88 has released the arm 89 the whole lever arrangement becomes free and the ejector falls back on the table under the combined action of its proper weight and that of the spring 98. While the wheel-gearing (shown in Figs. 4, 4ª, and 5) continues to rotate, the wheels 124 125 126 act on the sector 127 in order to lower the compressor at the same time the cam 130 frees the pawl 129, which engages again with the teeth of the ratchet-wheel 128. During this time the cams 101 and 102, Fig. 11, have completed one revolution and have again operated the tappet 110, which releases the sector 111, the roller 112 of which acts on the vibrating arm 72 for the purpose of drawing the needle into its backward position, and as the oscillating system 103 110 is immediately returned into the position of Fig. 11 the needle remains in its backward position. At this moment the binding medium is stretched between the points 69 and 71—say across the path of the ascending grain—the compressor is lowered, and the mechanism is ready for receiving the material to be formed into a sheaf.

Having now particularly described and ascertained the nature of my invention and in what manner the same may be performed, I declare that what I claim is—

1. In a harvester and binder, a binding mechanism comprising a sleeve, operating means therefor, a disk fixed to said sleeve and provided on each of its faces with a cam, a series of levers operatively connected together and operated by said cams, a tappet operatively connected with said levers, a shaft 53 provided with notches, a sector having a nave loosely mounted on said shaft 53, a frame mounted on the nave of the sector and provided with a pin adapted to engage in the notches of said shaft 53 for connecting the sector therewith causing thereby the operation of the sector, said frame further provided with an extension adapted to be engaged by said tappet for disconnecting said frame from said shaft 53, a pair of rollers carried by the sector, a needle, and a vibrating lever connected therewith and provided with a tappet, said lever adapted when the sector is operated to be engaged by and operated by one of said rollers for drawing back the said needle and to have its tappet engaged by the other of said rollers for moving forward the said needle, in combination with operative devices coöperating with said binding mechanism.

2. In a machine of the character described, involving a conveyer mechanism comprising an endless apron, an operating-shaft therefor, a ratchet-wheel on said shaft a roller loosely mounted on said shaft, a plate fixed to said roller and carrying a pawl adapted to engage and rotate with said ratchet-wheel causing thereby the operation of said roller and apron, a cam adapted to engage the pawl to release it from its engagement with the ratchet-wheel, a lever mechanism connected to said cam and adapted to move said cam into and out of engagement with the said pawl, a rod connected with said lever mechanism, means for elevating said rod, means for retaining said rod in its elevated position, and means for releasing said rod, causing thereby the operation of said lever mechanism.

3. In a harvesting-machine, the combination with compressor, binder, ejector and conveyer mechanisms and operating means therefor, of a trip mechanism suitably engaging with said operating means for throwing said mechanisms into and out of operation, said trip mechanism comprising an oscillatory frame, an arm carried thereby and provided with a notch, a friction-roller having its axis carried by said frame, an arm upon said axis having a projection, a vertically-movable rod provided with a pawl to engage said projection, a small arm upon said axis, a toothed wheel, lever mechanism connected with the rod and provided with a cam, a disk provided with a pawl and roller, a ratchet-wheel arranged in operative relation with respect to the pawl upon said disk, a toothed wheel arranged in operative relation with respect to the toothed wheel upon said vertically-movable rod, a disk provided with a pawl arranged in operative relation with respect to the friction-roller, and a ratchet-wheel arranged in operative relation with respect to the pawl carried by the last-mentioned disk.

4. In a machine of the character described, a compressor mechanism comprising the combination with a pawl and a cam for controlling the movement thereof, of a support, a toothed sector loosely mounted thereon, a ratchet fixed to said sector and engaged by said pawl, means engaging the sector for operating it, a yoke loosely mounted upon said support and operated by the sector, and a compressor-arm connected to the yoke and moving therewith.

5. In a machine of the character described, the combination with a sheaf-compressor, of an operating mechanism therefor, said sheaf-compressor-operating mechanism comprising a mutilated gear, operating means therefor, a loosely-mounted gear-wheel engaged and operated by said mutilated gear, a toothed sector 126 carried by said loosely-mounted gear, a toothed sector 127 adapted to engage and operate the sheaf-compressor, a supporting means for said sectors 126 and 127, said sector 127 engaged and operated by said sector 126, a ratchet carried by said sector 127, a pawl engaging said ratchet and adapted to prevent the operation of said sector 127, and means for releasing the pawl from the ratchet to permit of the operation of said sector 127.

6. A harvester comprising a cut-grain-receiving table upon which the sheaf is adapted to be formed, said table at its inner end provided with a depending extension, a bent plate arranged in suitable relation to said extension and forming with said extension a channel through which the cut grain passes to said table, a pair of curved arms extending upon said table and forming ejectors, operating means for said arms, a curvilinear arm arranged over said table and forming a sheaf-compressor, means connected to the inner end of said arm for suitably operating it, means for elevating the cut grain through said channel to said table, a knotting device, a needle in connection with said knotting device adapted to extend a binding medium over the cut grain during the formation of a sheaf and further adapted to pass the binding medium below the cut grain when the sheaf is to be bound up, lever mechanism engaging with and suitably operating the said needle, a cam for operating said lever mechanism, an intermittently-operated conveyer adapted to convey cut grain to one end of said channel, operating means for said conveyer adapted to be connected thereto, an oscillating frame, means for operating said frame when the sheaf has reached the desired thickness, and mechanism connected with and operated by the said frame when the latter is operated for disconnecting the operating mechanism for the conveyer therefrom.

In testimony whereof I have hereunto set my hand in presence of two subscribing witnesses.

ANDRÉ CASTELIN.

Witnesses:
EDWARD P. MACLEAN,
EMILE KLOTZ.